United States Patent
Hou et al.

(10) Patent No.: US 7,127,482 B2
(45) Date of Patent: Oct. 24, 2006

(54) PERFORMANCE OPTIMIZED APPROACH FOR EFFICIENT DOWNSAMPLING OPERATIONS

(75) Inventors: Yan Hou, Folsom, CA (US); Hong Jiang, San Jose, CA (US); Kam Leung, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 513 days.

(21) Appl. No.: 09/989,857

(22) Filed: Nov. 19, 2001

(65) Prior Publication Data
US 2003/0115233 A1   Jun. 19, 2003

(51) Int. Cl.
G06F 17/14  (2006.01)
G06F 7/38   (2006.01)

(52) U.S. Cl. .................. 708/402; 708/523
(58) Field of Classification Search ............ 708/402, 708/523, 524
See application file for complete search history.

(56) References Cited

U.S. PATENT DOCUMENTS

| | | | |
|---|---|---|---|
| 5,594,679 A * | 1/1997 | Iwata | 708/402 |
| 6,327,602 B1 * | 12/2001 | Kim | 708/402 |
| 6,526,430 B1 * | 2/2003 | Hung et al. | 708/523 |

* cited by examiner

*Primary Examiner*—Tan V. Mai
(74) *Attorney, Agent, or Firm*—Alan L. Pedersen-Giles

(57) ABSTRACT

An algorithm and hardware structure is described for numerical operations on signals that is reconfigurable to operate in a downsampling or non-downsampling mode. According to one embodiment, a plurality of adders and multipliers are reconfigurable via a switching fabric to operate as a plurality of MAAC ( multiply-add-accumulator) kernels (described in detail below), when operating in a non-downsampling mode and a plurality of MAAC kernels and AMAAC (add-multiply-add-accumulator) kernals (described in detail below), when operating in a downsampling mode.

10 Claims, 14 Drawing Sheets

PERFORMANCE OPTIMIZED APPROACH FOR EFFICIENT DOWNSAMPLING OPERATIONS

FIELD OF THE INVENTION

The present invention relates to the areas of computation and algorithms and specifically to the areas of digital signal processing ("DSP") and digital logic for performing DSP operations to the areas of digital signal processing, algorithms, structures and systems for performing digital signal processing. In particular, the present invention relates to reconfigurable system for providing non-downsampling and downsampling operations on a signal.

BACKGROUND INFORMATION

Digital signal processing ("DSP") and information theory technology is essential to modern information processing and in telecommunications for both the efficient storage and transmission of data. In particular, effective multimedia communications including speech, audio and video relies on efficient methods and structures for compression of the multimedia data in order to conserve bandwidth on the transmission channel as well as to conserve storage requirements.

Many DSP algorithms rely on transform kernels such as an FFT ("Fast Fourier Transform"), DCT ("Discrete Cosine Transform"), etc. For example, the discrete cosine transform ("DCT") has become a very widely used component in performing compression of multimedia information, in particular video information. The DCT is a loss-less mathematical transformation that converts a spatial or time representation of a signal into a frequency representation. The DCT offers attractive properties for converting between spatial/time domain and frequency representations of signals as opposed to other transforms such as the DFT ("Discrete Fourier Transform")/FFT. In particular, the kernel of the transform is real, reducing the complexity of processor calculations that must be performed. In addition, a significant advantage of the DCT for compression is that it exhibits an energy compaction property, wherein the signal energy in the transform domain is concentrated in low frequency components, while higher frequency components are typically much smaller in magnitude, and may often be discarded. The DCT is in fact asymptotic to the statistically optimal Karhunen-Loeve transform ("KLT") for Markov signals of all orders. Since its introduction in 1974, the DCT has been used in many applications such as filtering, transmultiplexers, speech coding, image coding (still frame, video and image storage), pattern recognition, image enhancement and SAR/IR image coding. The DCT has played an important role in commercial applications involving DSP, most notably it has been adopted by MPEG ("Motion Picture Experts Group") for use in MPEG 2 and MPEG 4 video compression algorithms.

A computation that is common in digital filters such as finite impulse response ("FIR") filters or linear transformations such as the DFT and DCT may be expressed mathematically by the following dot-product equation:

$$d = \sum_{i=0}^{N-1} a(i) * b(i)$$

where a(i) are the input data, b(i) are the filter coefficients (taps) and d is the output. Typically a multiply-accumulator ("MAC") is employed in traditional DSP design in order to accelerate this type of computation. A MAC kernel can be described by the following equation:

$$d^{[i+1]} = d^{[i]} + a(i) * b(i) \text{ with initial value } d^{[0]} = 0.$$

In some cases it is advantageous to downsample a signal. For example, with images, it is often advantageous to view an image in a smaller frame. However, the algorithms for generating a downsampled signal vs. a non-downsampled signal will typically vary significantly. Thus, typically it is required to provide separate hardware structures to generate either a downsampled signal or a non-downsampled signal. This is highly disadvantageous as it results in increased hardware area, complexity and cost. Thus, it would be advantageous to develop a hardware structure capable of operating in one of a downsampling or non-downsampling modes, while reducing the redundancy of hardware elements as much as possible.

BRIEF DESCRIPTION OF THE DRAWINGS

FIG. 1b is a block diagram of a video decoding system.

DETAILED DESCRIPTION

The present invention provides an algorithm and hardware structure for numerical operations on signals that is reconfigurable to operate in a downsampling or non-downsampling mode. According to one embodiment, a plurality of adders and multipliers are reconfigurable via a switching fabric to operate as a plurality of MAAC kernels (described in detail below), when operating in a non-downsampling mode, and a plurality of MAAC kernels and AMAAC kernels (described in detail below), when operating in a downsampling mode. According to one embodiment, the downsampling and non-downsampling operations are performed as part of an IDCT process.

Figure 1A:
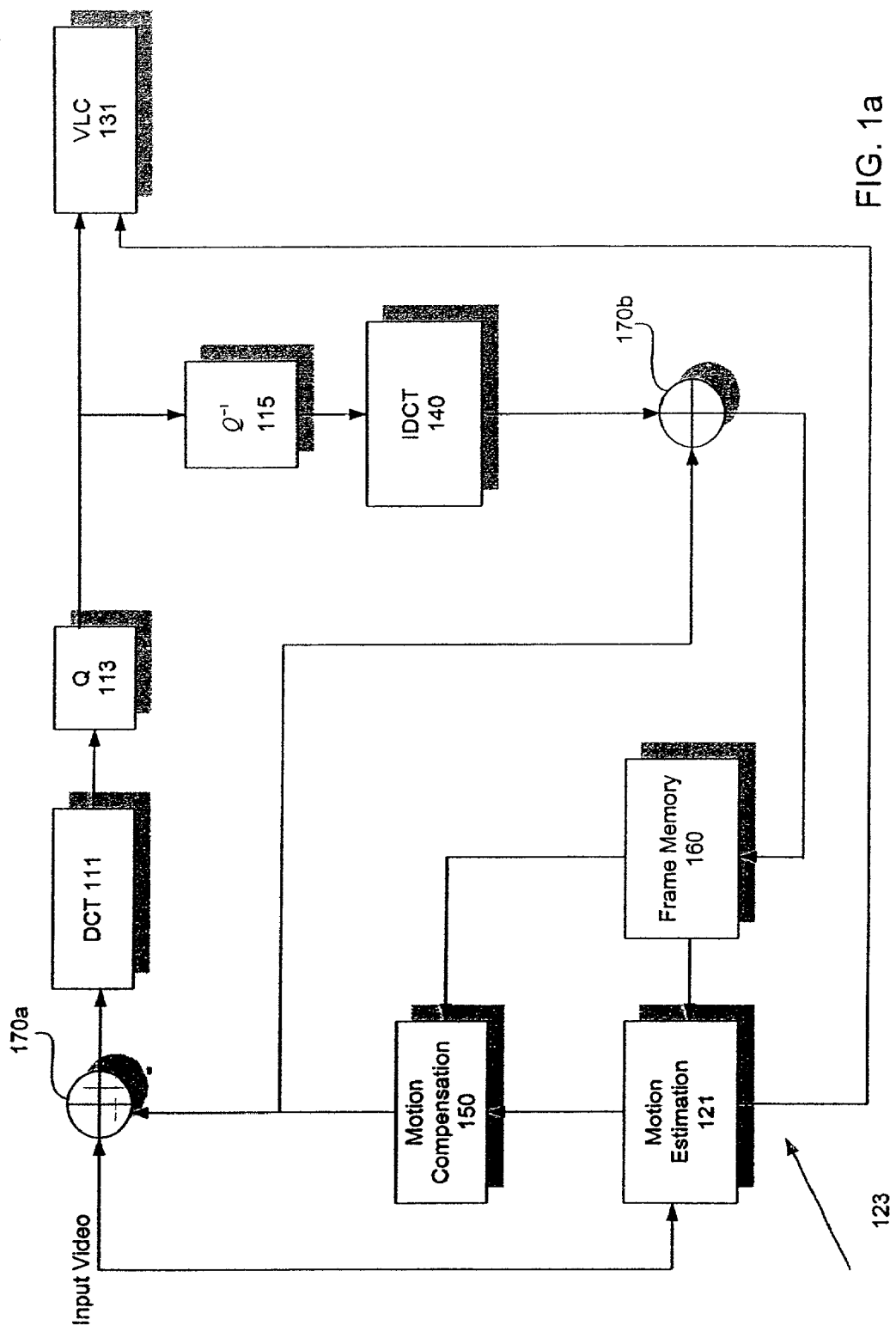
FIG. 1a is a block diagram of a video encoding system.

FIG. 1a is a block diagram of a video encoding system. Video encoding system 123 includes DCT block 111, quantization block 113, inverse quantization block 115, IDCT block 140, motion compensation block 150, frame memory block 160, motion estimation block and VLC ("Variable Length Coder") block 131. Input video is received in digitized form. Together with one or more reference video data from frame memory, input video is provided to motion estimation block 121, where a motion estimation process is performed. The output of motion estimation block 121 containing motion information such as motion vectors is transferred to motion compensation block 150 and VLC block 131. Using motion vectors and one or many reference video data, motion compensation block 150 performs motion compensation process to generate motion prediction results. Input video is subtracted at adder 170a by the motion prediction results from motion compensation block 150.

The output of adder is provided to DCT block 111 where a DCT computed. The output of the DCT is provided to quantization block 113, where the frequency coefficients are quantized and then transmitted to VLC ("Variable Length Coder") 131, where a variable length coding process (e.g., Huffman coding) is performed. Motion information from motion estimation block 121 and quantized indices of DCT coefficients from Q block 113 are provided to VLC block 131. The output of VLC block 131 is the compressed video data output from video encoder 123 The output of quantities block 113 is also transmitted to inverse quantization block 115, where an inverse quantization process is performed.

The output of inverse quantization block is provided to IDCT block 140, where IDCT is performed. The output of IDCT block is summered at adder 107(b) with motion prediction results from motion compensation. The output of adder 170b is reconstructed video data and is stored in the frame memory block 160 to serve as reference data for the encoding of future video data.

FIG. 1b is a block diagram of a video decoding system. Video decoding system 125 includes variable length decoder ("VLD") block 110, inverse scan ("IS") block 120, inverse quantization block ("IQ") 130, IDCT block 140, frame memory block 160, motion compensation block 150 and adder 170. A compressed video bitstream is received by VLD block and decoded. The decoded symbols are converted into quantized indices of DCT coefficients and their associated sequential locations in a particular scanning order. The sequential locations are then converted into frequency-domain locations by the IS block 120. The quantized indices of DCT coefficients are converted to DCT coefficients by the IQ block 130. The DCT coefficients are received by IDCT block 140 and transformed. The output from the IDCT is then combined with the output of motion compensation block 150 by the adder 170. The motion compensation block 150 may reconstruct individual pictures based upon the changes from one picture to its reference picture(s). Data from the reference picture(s), a previous one or a future one or both, may be stored in a temporary frame memory block 160 such as a frame buffer and may be used as the references. The motion compensation block 150 uses the motion vectors decoded from the VLD 110 to determine how the current picture in the sequence changes from the reference picture(s). The output of the motion compensation block 150 is the motion prediction data. The motion prediction data is added to the output of the IDCT 140 by the adder 170. The output from the adder 170 is then clipped (not shown) to become the reconstructed video data.

Figure 2:
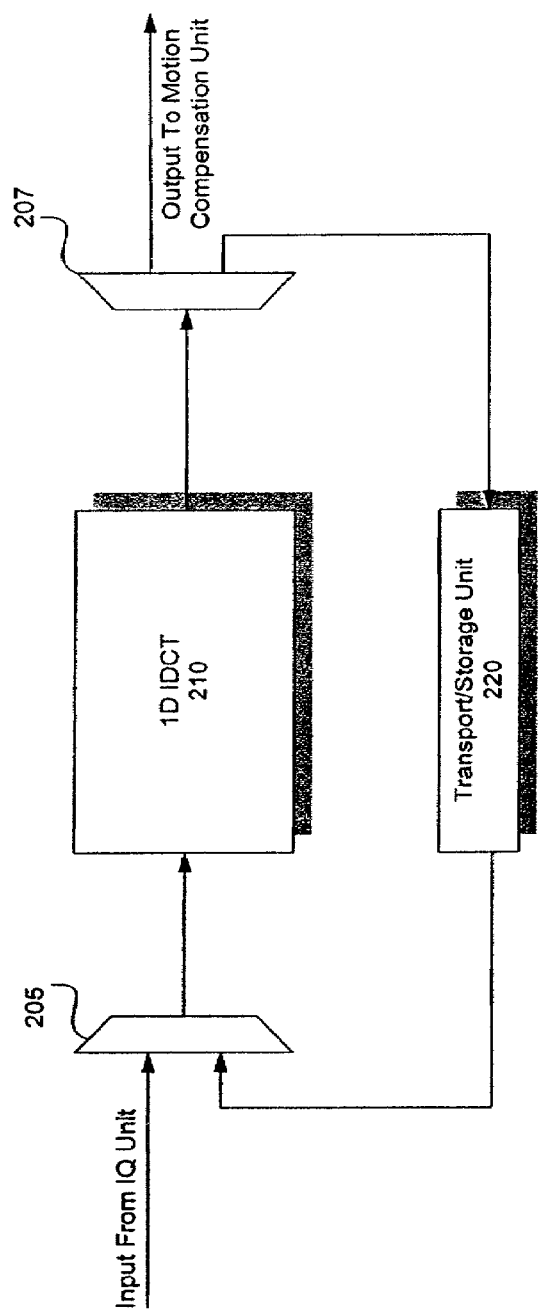
FIG. 2 is a block diagram of a datapath for computing a 2-D IDCT.

FIG. 2 is a block diagram of a datapath for computing a 2-dimensional (2-D) IDCT according to one embodiment of the present invention. It includes a data multiplexer 205, a 1-D IDCT block 210, a data demultiplexer 207 and a transport storage unit 220. Incoming data from IQ is processed in two passes through the IDCT. In the first pass, the IDCT block is configured to perform a 1-D IDCT transform along vertical direction. In this pass, data from IQ is selected by the multiplexer 210 and processed by the 1-D IDCT block 210. The output from IDCT block 210 is an intermediate results that are selected by the demultiplexer to be stored in the transport storage unit 220. In the second pass, IDCT block 210 is configured to perform 1-D IDCT along horizontal direction. As such, the intermediate data stored in the transport storage unit 220 is selected by multiplexer 205, and processed by the 1-D IDCT block 210. Demultiplexer 207 outputs results from the 1-D IDCT block as the final result of the 2-D IDCT.

Many computational processes such as the transforms described above (i.e., DCT, IDCT, DFT, etc) and filtering operations rely upon a multiply and accumulate kernel. That is, the algorithms are effectively performed utilizing one or more multiply and accumulate components typically implemented as specialized hardware on a DSP or other computer chip. The commonality of the MAC nature of these processes has resulted in the development of particular digital logic and circuit structures to carry out multiply and accumulate processes. In particular, a fundamental component of any DSP chip today is the MAC unit.

Figure 3:
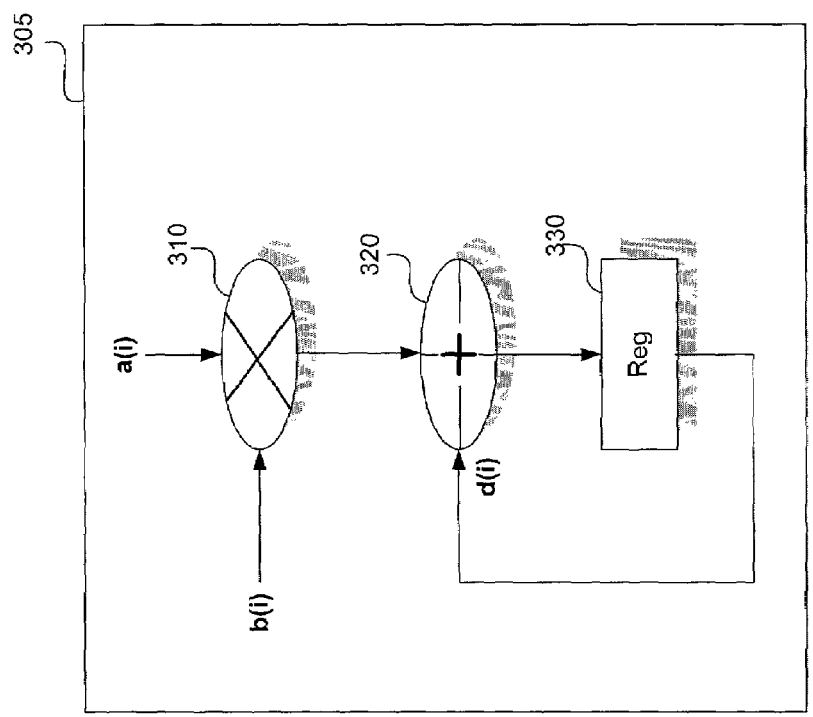
FIG. 3 is a block diagram illustrating the operation of a MAC kernel.

FIG. 3 is a block diagram illustrating the operation of a MAC kernel. Multiplier 310 performs multiplication of input datum a(i) and filter coefficient b(i), the result of which is passed to adder 320. Adder 320 adds the result of multiplier 310 to accumulated output $d^{[i]}$ which was previously stored in register 330. The output of adder 320 ($d^{[i+1]}$) is then stored in register 330. Typically a MAC output is generated on each clock cycle.

Figure 4:
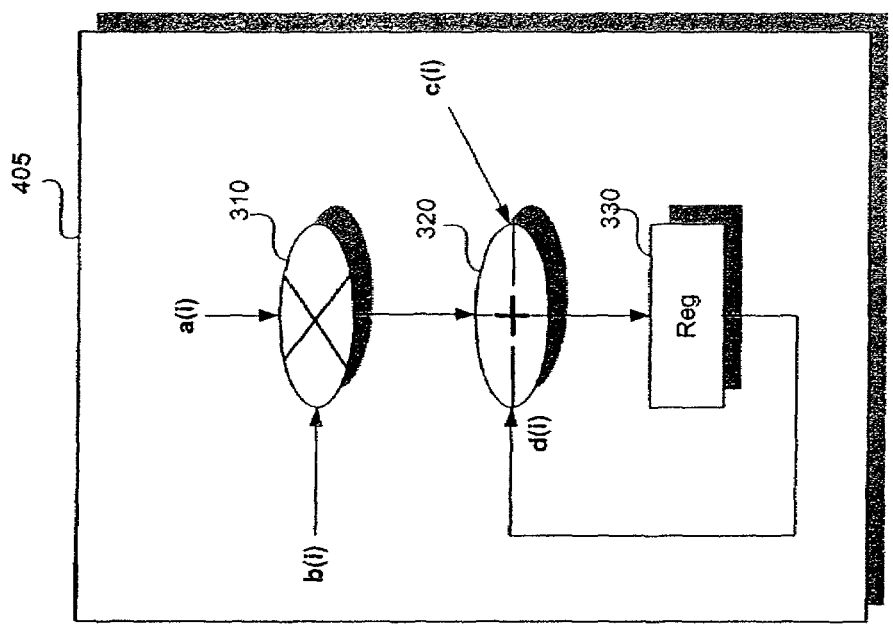
FIG. 4 is a block diagram illustrating the operation of a MAAC kernel according to one embodiment of the present invention.

FIG. 4 is a block diagram illustrating the operation of a MAAC kernel according to one embodiment of the present invention. The MAAC kernel can be described by the following recursive equation:

$$d^{[i+1]}=d^{[i]}+a(i)*b(i)+c(i) \text{ with initial value } d^{[0]}=0.$$

MAAC kernel 405 includes multiplier 310, adder 320 and register 330. Multiplier 310 performs multiplication of input datum a(i) and filter coefficient b(i), the result of which is passed to adder 320. Adder 320 adds the result of multiplier 310 to a second input term c(i) along with accumulated output $d^{[i]}$, which was previously stored in register 330. The output of adder 320 ($d^{[i+1]}$) is then stored in register 330.

As an additional addition (c(i)) is performed each cycle, the MAAC kernel will have higher performance throughput for some class of computations. For example, the throughput of a digital filter with some filter coefficients equal to one can be improved utilizing the MAAC architecture depicted in FIG. 4.

Figure 5:
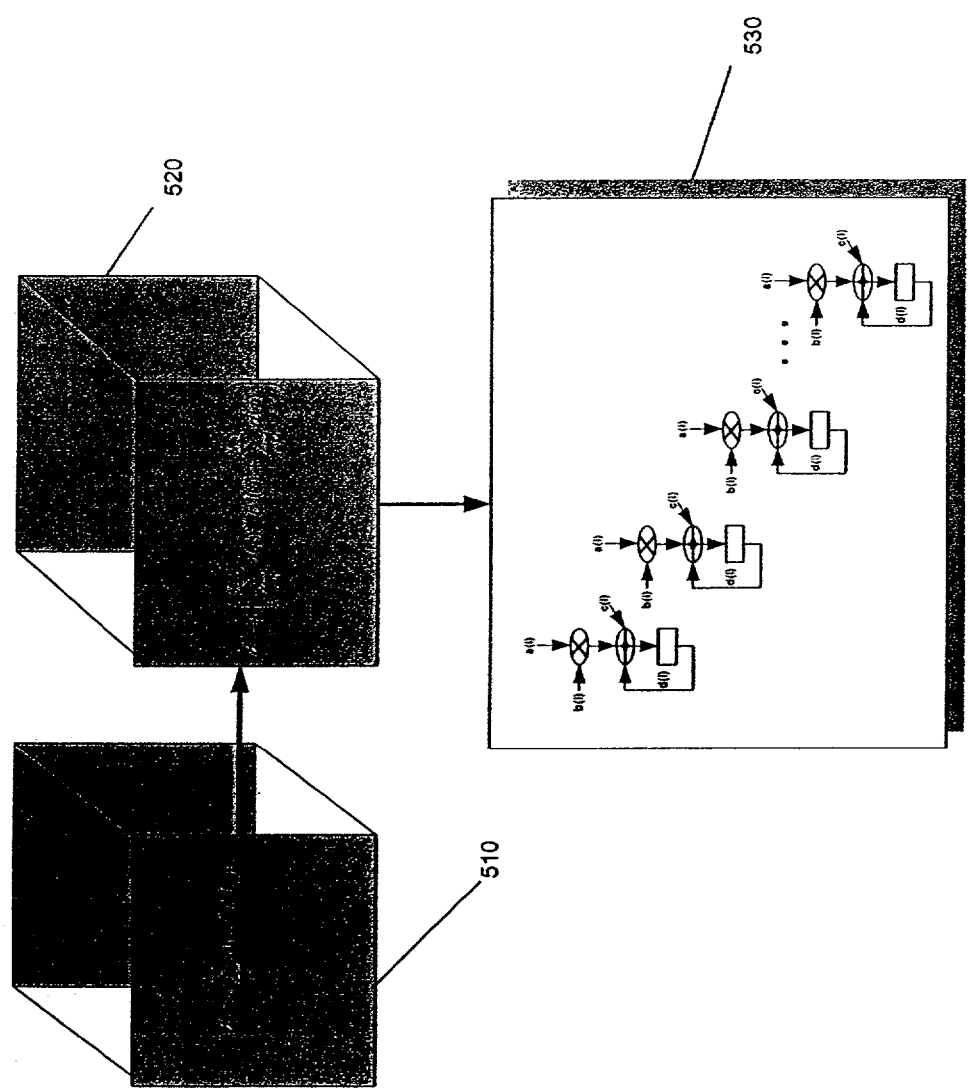
FIG. 5 illustrates a paradigm for improving computational processes utilizing a MAAC kernel according to one embodiment of the present invention.

FIG. 5 illustrates a paradigm for improving computational processes utilizing a MAAC kernel according to one embodiment of the present invention. In 510, an expression for a particular computation is determined. Typically, the computation is expressed as a linear combination of input elements a(i) scaled by a respective coefficient b(i). That is, the present invention provides for improved efficiency of performance for computational problems that may be expressed in the general form:

$$d = \sum_{i=0}^{N-1} a(i) * b(i)$$

where a(i) are the input data, b(i) are coefficients and d is the output. As noted above, utilizing a traditional MAC architecture, output d may be computed utilizing a kernel of the form:

$$d^{[i+1]} = d^{[i]} + a(i)*b(i) \text{ with initial value } d^{[0]}=0.$$

This type of computation occurs very frequently in many applications including digital signal processing, digital filtering etc.

In 520, a common factor 'c' is factored out of the expression obtaining the following expression:

$$d = c\sum_{i=0}^{N-1} a(i) * b'(i) \text{ where } b(i) = cb'(i).$$

If as a result of factoring the common factor c, some of the coefficients b'(i) are unity, then the following result is obtained.

$$d = c\left(\sum_{i=0}^{M-1} a(i) * b'(i) + \sum_{i=M}^{N-1} a(i)\right) \text{ where } \{b'(i) = 1 : M \leq i \leq N-1\}$$

This may be effected, for example, by factoring a matrix expression such that certain matrix entries are '1'. The above expression lends itself to use of the MAAC kernel described above by the recursive equation:

$$d^{[i+1]} = d^{[i]} + a(i)*b(i) + c(i) \text{ with initial value } d^{[0]}=0.$$

In this form the computation utilizes at least one addition per cycle due to the unity coefficients.

In step 530, based upon the re-expression of the computational process accomplished in step 510, one or more MAAC kernels are arranged in a configuration to carry out the computational process as represented in its re-expressed form of step 520.

The paradigm depicted in FIG. 5 is particularly useful for multiply and accumulate computational processes. According to one embodiment, described herein, the method of the present invention is applied to provide a more efficient IDCT computation, which is a multiply and accumulate process typically carried out using a plurality of MAC kernels.

According to one embodiment, the present invention is applied to the IDCT in order to reduce computational complexity and improve efficiency. According to the present invention, the number of clock cycles required in a particular hardware implementation to carry out the IDCT is reduced significantly by application of the present invention.

The 2-D DCT may be expressed as follows:

$$y_{kl} = \sqrt{\frac{2}{M}}\, a(k)\sqrt{\frac{2}{N}}\, a(l)\sum_{i=0}^{M-1}\sum_{k=0}^{N-1} x_{ij}\cos\left(\frac{(2i+1)k\pi}{2M}\right)$$
$$\cos\left(\frac{(2j+1)l\pi}{2N}\right)$$

where $a(k) = \begin{cases} \frac{1}{\sqrt{2}}, & \text{if } k = 0 \\ 1 & \text{otherwise} \end{cases}$ The 2-D DCT and IDCT are separable and may be factored as follows:

$$x_{ij} = \sum_{k=0}^{M-1}\sum_{l=0}^{N-1} y_{kl}\sqrt{\frac{2}{M}}\, a(k)\sqrt{\frac{2}{N}}\, a(l)\cos\left(\frac{(2i+1)k\pi}{2M}\right)$$
$$\cos\left(\frac{(2j+1)l\pi}{2N}\right)$$

where $a(k) = \begin{cases} \frac{1}{\sqrt{2}}, & \text{if } k = 0 \\ 1 & \text{otherwise} \end{cases}$ The 2-D DCT and IDCT are separable and may be factored as follows:

$$x_{ij} = \sum_{k=0}^{M-1} z_{kj} e_{i,M}(k)$$

for i=0, 1, . . . , M−1 and j=0, 1, . . . , N−1 where the temporal 1-D IDCT data are:

$$z_{k,j} = \sum_{l=0}^{N-1} y_{kl} e_{j,N}(l)$$

for k=0, 1, . . . , M−1 and j=0, 1, . . . , N−1 and the DCT basis vectors $e_1(m)$ are:

$$e_{1,M}(k) = \sqrt{\frac{2}{M}}\, a(k)\cos\left(\frac{(2i+1)k\pi}{2M}\right)$$

for i,k=0, 1, . . . , M−1 A fast algorithm for calculating the IDCT (Chen) capitalizes of the cyclic property of the transform basis function (the cosine function). For example, for an eight-point IDCT, the basis function only assumes 8 different positive and negative values as shown in the following table:

| j/1 | 0    | 1     | 2     | 3     | 4     | 5     | 6     | 7     |
|-----|------|-------|-------|-------|-------|-------|-------|-------|
| 0   | c(0) | c(1)  | c(2)  | c(3)  | c(4)  | c(5)  | c(6)  | c(7)  |
| 1   | c(0) | c(3)  | c(6)  | −c(7) | −c(4) | −c(1) | −c(2) | −c(5) |
| 2   | c(0) | c(5)  | −c(6) | −c(1) | −c(4) | c(7)  | c(2)  | c(3)  |
| 3   | c(0) | c(7)  | −c(2) | −c(5) | c(4)  | c(3)  | −c(6) | −c(1) |
| 4   | c(0) | −c(7) | −c(2) | c(5)  | c(4)  | −c(3) | −c(6) | c(1)  |
| 5   | c(0) | −c(5) | −c(6) | c(1)  | −c(4) | −c(7) | c(2)  | −c(3) |
| 6   | c(0) | −c(3) | c(6)  | c(7)  | −c(4) | c(1)  | −c(2) | c(5)  |
| 7   | c(0) | −c(1) | c(2)  | −c(3) | c(4)  | −c(5) | c(6)  | −c(7) |

Where c(m) is the index of the following basis terms.

$$c(m) = a(m)\cos\left(\frac{m\pi}{16}\right)$$

$$= \left\{\cos\left(\frac{\pi}{4}\right), \cos\left(\frac{\pi}{16}\right), \cos\left(\frac{\pi}{8}\right), \cos\left(\frac{3\pi}{16}\right), \cos\left(\frac{\pi}{4}\right), \cos\left(\frac{5\pi}{16}\right), \cos\left(\frac{3\pi}{8}\right), \cos\left(\frac{7\pi}{16}\right)\right\}$$

$$= \left\{\cos\left(\frac{\pi}{4}\right), \cos\left(\frac{\pi}{16}\right), \cos\left(\frac{\pi}{8}\right), \cos\left(\frac{3\pi}{16}\right), \cos\left(\frac{\pi}{4}\right), \sin\left(\frac{3\pi}{16}\right), \sin\left(\frac{\pi}{8}\right), \sin\left(\frac{\pi}{16}\right)\right\}$$

The cyclical nature of the IDCT shown in the above table provides the following relationship between output terms of the 1-D IDCT:

$$\frac{x_i + x_{7-i}}{2} = e_i(0)y_0 + e_i(2)y_2 + e_i(4)y_4 + e_i(6)y_6$$

$$\frac{x_i + x_{7-i}}{2} = e_i(1)y_1 + e_i(3)y_3 + e_i(5)y_5 + e_i(7)y_7$$

where the basis terms $e_i(k)$ have sign and value mapped to the DCT basis terms c(m) according to the relationship:

$$e_i(k) = \pm \frac{1}{2}c(m(i,k))$$

For a 4-point IDCT, the basis terms also have the symmetrical property illustrated in the above table as follows:

| j/1 | 0    | 1     | 2     | 3     |
|-----|------|-------|-------|-------|
| 0   | C(0) | C(2)  | C(4)  | C(6)  |
| 1   | C(0) | C(6)  | −C(4) | −C(2) |
| 2   | C(0) | −C(6) | −C(4) | C(2)  |
| 3   | C(0) | −C(2) | C(4)  | −C(6) |

The corresponding equations are:

$$\frac{x_i + x_{3-1}}{2} = e_i(0)y_0 + e_i(4)y_2$$

$$\frac{x_i - x_{3-i}}{2} = e_i(2)y_1 + e_i(6)y_3$$

Based upon the above derivation, a 1D 8-point IDCT can be represented by the following matrix vector equation:

$$\begin{bmatrix} x_0 \\ x_1 \\ x_2 \\ x_3 \end{bmatrix} = \frac{1}{2}A\begin{bmatrix} y_0 \\ y_4 \\ y_2 \\ y_6 \end{bmatrix} + \frac{1}{2}B\begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = \frac{1}{2}A\begin{bmatrix} y_0 \\ y_4 \\ y_2 \\ y_6 \end{bmatrix} - \frac{1}{2}B\begin{bmatrix} y_1 \\ y_5 \\ y_3 \\ y_7 \end{bmatrix}$$

where:

$$A = \begin{bmatrix} c(0) & c(4) & c(2) & c(6) \\ c(0) & -c(4) & c(6) & -c(2) \\ c(0) & -c(4) & -c(6) & c(2) \\ c(0) & c(4) & -c(2) & -c(6) \end{bmatrix}$$

$$B = \begin{bmatrix} c(1) & c(5) & c(3) & c(7) \\ c(3) & -c(1) & -c(7) & -c(5) \\ c(5) & c(7) & -c(1) & c(3) \\ c(7) & c(3) & -c(5) & -c(1) \end{bmatrix}$$

and $$c(0) = \cos\left(\frac{\pi}{4}\right)$$

and $$c(n) = \cos\left(\frac{n\pi}{16}\right)(n = 1, 2, 3, 4, 5, 6\,7)$$

Note that $$A^{-1} = \frac{1}{2}A^T \text{ and } B^{-1} = \frac{1}{2}B^T$$

Using the paradigm depicted in FIG. 5, a common factor may be factored from the matrix equation above such that certain coefficients are unity. The unity coefficients then allow for the introduction of a number of MAAC kernels in a computational architecture, thereby reducing the number of clock cycles required to carry out the IDCT. In particular, by factoring $$c(0) = c(4) = \frac{1}{\sqrt{2}}$$

out from the matrix vector equation above, the following equation is obtained.

$$\begin{bmatrix} x_0 \\ x_1 \\ x_2 \\ x_3 \end{bmatrix} = \frac{1}{2}A'\begin{bmatrix} y_0 \\ y_4 \\ y_2 \\ y_6 \end{bmatrix} + \frac{1}{2}B'\begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = \frac{1}{2}A'\begin{bmatrix} y_0 \\ y_4 \\ y_2 \\ y_6 \end{bmatrix} - \frac{1}{2}B'\begin{bmatrix} y_1 \\ y_5 \\ y_3 \\ y_7 \end{bmatrix}$$

-continued where:

$$A' = \begin{bmatrix} 1 & 1 & c'(2) & c'(6) \\ 1 & -1 & c'(6) & -c'(2) \\ 1 & -1 & -c'(6) & c'(2) \\ 1 & 1 & -c'(2) & -c'(6) \end{bmatrix}$$

$$B' = \begin{bmatrix} c'(1) & c'(5) & c'(3) & c'(7) \\ c'(3) & -c'(1) & -c'(7) & -c'(5) \\ c'(5) & c'(7) & -c'(1) & c'(3) \\ c'(7) & c'(3) & -c'(5) & -c'(1) \end{bmatrix}$$

Because the factor $$\frac{1}{\sqrt{2}}$$

is factored out of the matrix vector equation, the results after two-dimensional operations would carry a scale factor of two. Dividing the final result by 2 after the two-dimensional computation would result in the correct transform.

Note that the expression for the IDCT derived above incorporates multiple instances of the generalized expression $$d = \sum_{i=0}^{N-1} a(i) * b(i)$$

re-expressed as $$d = c \left( \sum_{i=0}^{M-1} a(i) * b'(i) + \sum_{i=M}^{N-1} a(i) \right)$$

where $\{b'(i)=1:M \leq i \leq N-1\}$ to which the present invention is addressed. This is a consequence of the nature of matrix multiplication and may be seen as follows (unpacking the matrix multiplication):

$x_0=y_0+y_4+c'(2)*y_2+c'(6)*y_6+c'(1)*y_1+c'(5)*y_5+c'(3)*y_3+c'(7)*y_7$ $x_1=y_0-y_4+c'(6)*y_2-c'(2)*y_6+c'(3)*y_1-c'(1)*y_5-c'(7)*y_3-c'(5)*y_7$ $x_2=y_0-y_4-c'(6)*y_2+c'(2)*y_6+c'(5)*y_1-c'(7)*y_5-c'(1)*y_3+c'(3)*y_7$ $x_3=y_0+y_4-c'(2)*y_2-c'(6)*y_6+c'(7)*y_1+c'(3)*y_5-c'(5)*y_3-c'(1)*y_7$ $x_7=y_0+y_4+c'(2)*y_2+c'(6)*y_6-c'(1)*y_1-c'(5)*y_5-c'(3)*y_3-c'(7)*y_7$ $x_6=y_0-y_4+c'(6)*y_2-c'(2)*y_6-c'(3)*y_1+c'(1)*y_5+c'(7)*y_3+c'(5)*y_7$ $x_5=y_0-y_4-c'(6)*y_2+c'(2)*y_6-c'(5)*y_1+c'(7)*y_5+c'(1)*y_3-c'(3)*y_7$ $x_4=y_0+y_4-c'(2)*y_2-c'(6)*y_6-c'(7)*y_1-c'(3)*y_5+c'(5)*y_3+c'(1)*y_7$

Note that the above expressions do not incorporate scale factors ½, which can be computed at the end of the calculation simply as a right bit-shift.

Figure 6:
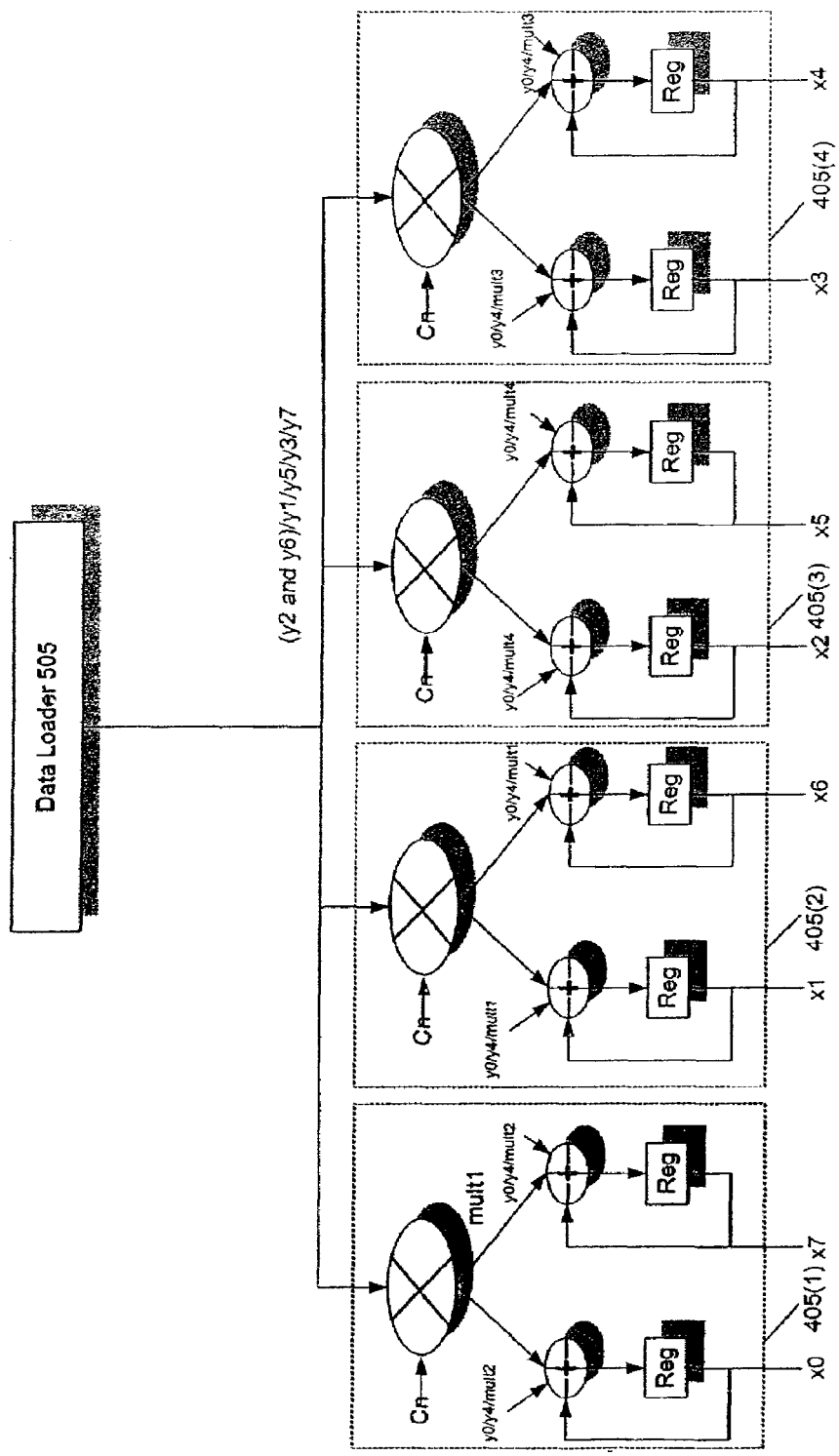
FIG. 6 is a block diagram of a hardware architecture for computing an eight-point IDCT utilizing a MAAC kernel according to one embodiment of the present invention.

FIG. 6 is a block diagram of a hardware architecture for computing an eight-point IDCT utilizing a MAAC kernel according to one embodiment of the present invention. The hardware architecture of FIG. 6 may be incorporated into a larger datapath for computation of an IDCT. As shown in FIG. 6, data loader 505 is coupled to four dual MAAC kernels 405(1)–405(4), each dual MAAC kernel including two MAAC kernels sharing a common multiplier. Note that the architecture depicted in FIG. 6 is merely illustrative and is not intended to limit the scope of the claims appended hereto. The operation of the hardware architecture depicted in FIG. 5 for computing the IDCT will become evident with respect to the following discussion.

Utilizing the architecture depicted in FIG. 6, a 1-D 8-point IDCT can be computed in 5 clock cycles as follows:

$1^{st}$ clock:
mult1=c'(1)*$y_1$
mult2=c'(3)*$y_1$
mult3=c'(5)*$y_1$
mult4=c'(7)*$y_1$
$x_0$(clk1)=$y_0$+mult1+0
$x_7$(clk1)=$y_0$−mult1+0
$x_1$(clk1)=$y_0$+mult2+0
$x_6$(clk1)=$y_0$−mult2+0
$x_2$(clk1)=$y_0$+mult3+0
$x_5$(clk1)=$y_0$−mult3+0
$x_3$(clk1)=$y_0$+mult4+0
$x_4$(clk1)=$y_0$−mult4+0

2nd Clock
mult1=c'(5)*$y_5$
mult2=−c'(1)*$y_5$
mult3=−c'(7)*$y_5$
mult4=c'(3)*$y_5$
$x_0$(clk2)=$y_4$+mult1+$x_0$(clk1)
$x_7$(clk2)=$y_4$−mult1+$x_7$(clk1)
$x_1$(clk2)=−$y_4$+mult2+$x_1$(clk1)
$x_6$(clk2)=−$y_4$−mult2+$x_6$(clk1)
$x_2$(clk2)=−$y_4$+mult3+$x_2$(clk1)
$x_5$(clk2)=−$y_4$−mult3+$x_5$(clk1)
$x_3$(clk2)=$y_4$+mult4+$x_3$(clk1)
$x_4$(clk2)=$y_4$−mult4+$x_4$(clk1)

3rd Clock
mult1=c'(3)*$y_3$
mult2=−c'(7)*$y_3$
mult3=−c'(1)*$y_3$
mult4=−c'(5)*$y_3$
$x_0$(clk3)=0+mult1+$x_0$(clk2)
$x_7$(clk3)=0−mult1+$x_7$(clk2)
$x_1$(clk3)=0+mult2+$x_1$(clk2)
$x_6$(clk3)=0−mult2+$x_6$(clk2)
$x_2$(clk3)=0+mult3+$x_2$(clk2)
$x_5$(clk3)=0−mult3+$x_6$(clk2)
$x_3$(clk3)=0+mult4+$x_3$(clk2)
$x_4$(clk3)=0−mult4+$x_4$(clk2)

4th Clock
mult1=c'(7)*$y_7$
mult2=−c'(5)*$y_7$
mult3=c'(3)*$y_7$
mult4=−c'(1)*$y_7$
$x_0$(clk4)=0+mult1+$x_0$(clk3)
$x_7$(clk4)=0−mult1+$x_7$(clk3)
$x_1$(clk4)=0+mult2+$x_1$(clk3)

Figure 7:
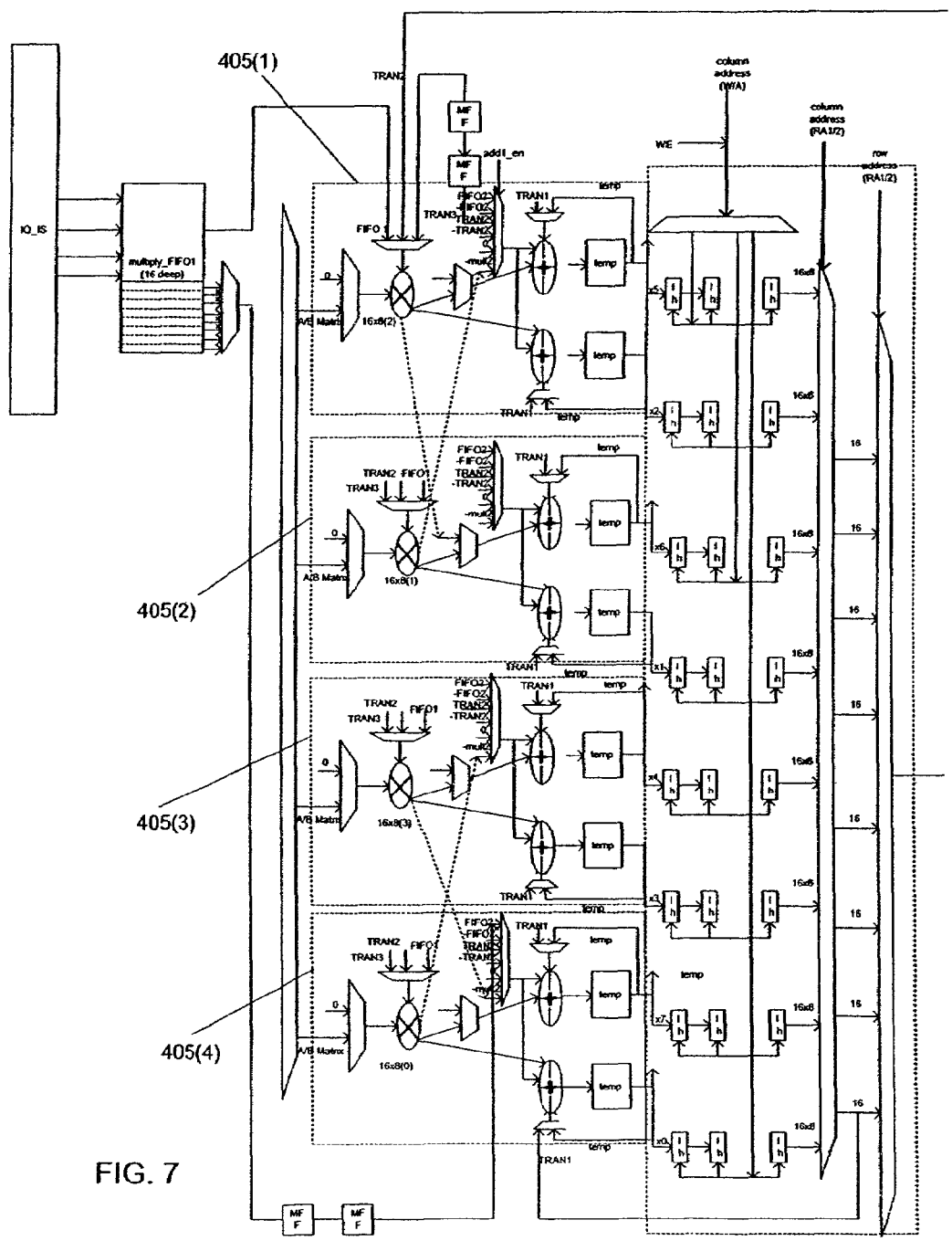
FIG. 7 is a block diagram of a datapath for computation of an 8-point IDCT utilizing the method of the present invention and a number of MAAC kernel components according to one embodiment of the present invention.

$x_6(clk4)=0-mult2+x_6(clk3)$
$x_2(clk4)=0+mult3+x_2(clk3)$
$x_5(clk4)=0+mult3+x_5(clk3)$
$x_3(clk4)=0+mult4+x_3(clk3)$
$x_4(clk4)=0-mult4+x_4(clk3)$ 5th Clock
$mult1=c'(2)*y_2$
$mult2=c'(6)*y_6$
$mult3=c'(6)*y_6$
$mult4=-c'(2)*y_2$
$x_0(clk5)=mult2+mult1+x_0(clk4)$
$x_7(clk5)=mult2+mult1+x_7(clk4)$
$x_1(clk5)=mult3+mult4+x_1(clk4)$
$x_6(clk5)=mult3+mult4+x_6(clk4)$
$x_2(clk5)=-mult3-mult4+x_2(clk4)$
$x_5(clk5)=-mult3-mult4+x_5(clk4)$
$x_3(clk5)=-mult1-mult2+x_3(clk4)$
$x_4(clk5)=-mult1-mult2+x_4(clk4)$ FIG. 7 is a block diagram of a datapath for computation of an 8-point IDCT utilizing the method of the present invention and a number of MAAC kernel components according to one embodiment of the present invention. Note that the datapath shown in FIG. 7 includes four dual MAAC kernels 405(1)–405(4).

According to an alternative embodiment, the MAAC kernel is modified to include two additional additions, to produce a structure herein referred to as the AMAAC kernel. The AMAAC kernel can be described by the following recursive equation:

$$d^{[i+1]}=d^{[i]}+[a(i)+e(i)]*b(i)+c(i) \text{ with initial value } d^{[0]}=0.$$

Figure 8:
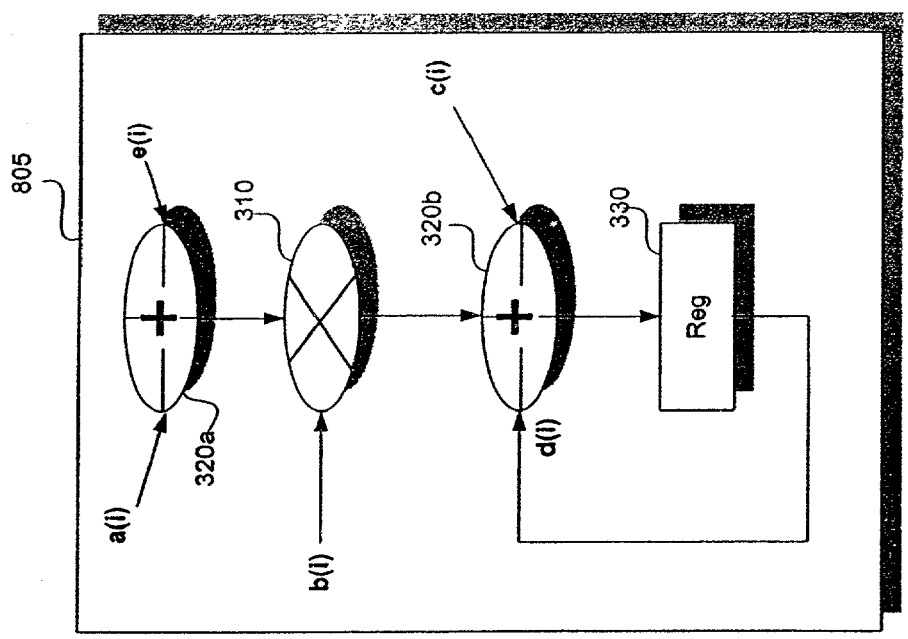
FIG. 8 is a block diagram illustrating the operation of an AMAAC kernel according to one embodiment of the present invention.
Figure 9:
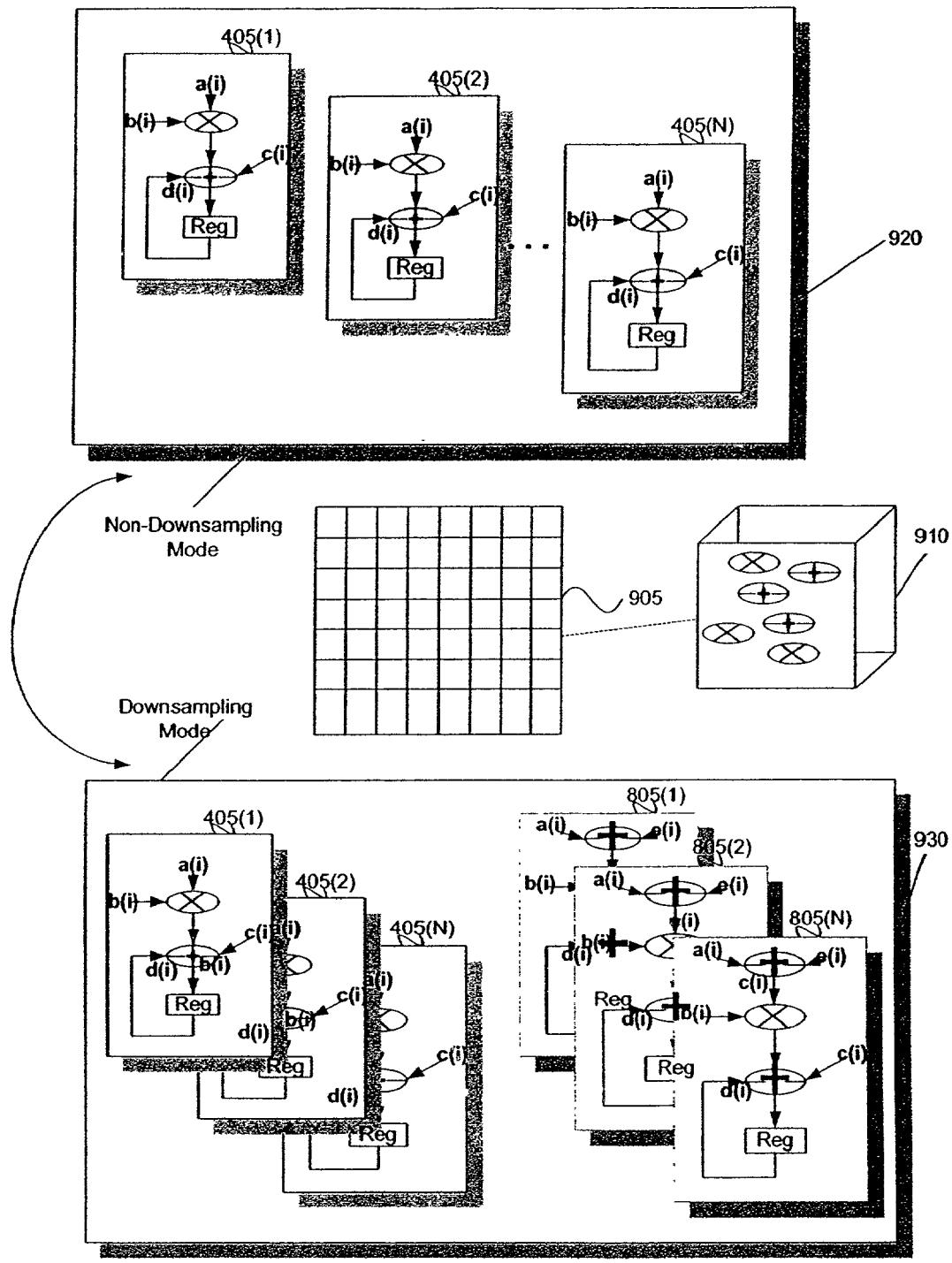
FIG. 9 is a block diagram of a reconfigurable downsampling computation engine according to one embodiment of the present invention.

FIG. 8 is a block diagram illustrating the operation of an AMAAC kernel according to one embodiment of the present invention. The AMAAC kernel, as described below with reference to FIG. 9, provides a structure for achieving more efficient downsampling computations. AMAAC kernel 805 includes multiplier 310, first adder 320a, second adder 320b and register 330. First adder 320a adds a(i) and e(i) Multiplier 310 performs multiplication of input datum [a(i)+e(i)] and filter coefficient b(i), the result of which is passed to adder 320b. Adder 320b adds the result of multiplier 310 to a second input term c(i) along with accumulated output $d^{[i]}$, which was previously stored in register 330. The output of adder 320 ($d^{[i+1]}$) is then stored in register 330.

As two more additions are performed during the same AMAAC cycle, the AMAAC kernel has a higher performance throughput for some class of computations. For example, a digital filter with some filter coefficients with equal value can take advantage (speed up) of the AMAAC kernel. Specifically, a(i), c(i), and e(i) can be considered as input data and b(i) as filter coefficients. With inputs a(i) and e(i) having the same filter coefficients b(i) and inputs c(i) with unity coefficients, all three groups of inputs can be processed in parallel.

The present invention may be applied to downsampling or filtering operations in general, not necessarily involving the IDCT. For example, the filtering of finite digital signals in the sample domain may be performed using convolution. A well-known circular convolution may be obtained, for example, by generating a periodic extension of the signal then applying a filter by performing a circular convolution on the periodically extended signal and an appropriate filter. This may be efficiently performed in the DFT domain, for example, by obtaining a simple multiplication of the DFT coefficients of the signal and the DFT coefficients of the filter and then applying the inverse DFT to the result. For the DCT, a convolution may be applied that is related to, but different from the DFT convolution. This is described, for example, in "Symmetric Convolution and the Discrete Sine and Cosine Transforms," by S. Martucci, IEEE Transactions on Signal Processing, Vol. 42, No. 5, May 1994, and includes a symmetric extension of the signal and filter, linear convolution, and applying a window to the result.

For example, considering a 2-D signal and a 2-D filter,or, assuming that the 2-D signal is represented as $y_{k,l}$ with DCT coefficients $x_{i,j}$ where $\{i, k\}$ are from 0 to M−1 and $\{j, l\}$ are from 0 to N−1, and assuming that the 2-D filter is represented as $h_{p,q}$ where p ranges from 0 to P−1 and q ranges from 0 to Q−1. According to this example, filter $h_{p,q}$ may be a symmetric low pass even length filter with filter length P and Q, where P=2M and Q=2N.

$$h_{p,q}=h_{2M-p-1,q}=h_{p,2N-q-1}=h_{2M-p-1,2N-q-1} \text{ for } p=0, 1, \ldots, M-1 \text{ and } q=0, 1, \ldots, N-1.$$

The DCT (frequency domain) coefficients $H_{k,l}$ for the filter $h_{p,q}$ may be obtained by applying a 2-D DCT to the fourth quadrant of the filter:

$$H_{kl} = \sqrt{\frac{2}{M}} a(k) \sqrt{\frac{2}{N}} a(l) \sum_{i=0}^{M-1}\sum_{j=0}^{N-1} h_{M+i,N+j}$$
$$\cos\left(\frac{(2i+1)k\pi}{2M}\right)\cos\left(\frac{(2j+1)l\pi}{2N}\right)$$

for k=0, 1, . . . , M−1 and l=0, 1, . . . , N−1. Then the filtering with respect to a particular sample in the inverse transform domain is performed by element-by-element multiplication of the signal DCT coefficients, $y_{k,l}$, and the filter DCT coefficients, $H_{k,l}$, and taking the appropriate inverse DCT transform of the DCT-domain multiplication results:

$$Y_{kl}=H_{kl}y_{kl} \text{ for } k=0, 1, \ldots, M-1 \text{ and } l32 0, 1, \ldots, N-1.$$

Downsampling may be performed in the DCT domain. For example, downsampling by two (2:1) in the horizontal direction, may be performed by taking the element-by-element multiplication of a signal that has been filtered, for example, according to the relationship:

$$Y'_{k,l} = \frac{1}{\sqrt{2}}(Y_{k,l} - Y_{k,N-1})$$

for k=0, 1, . . . , M−1 and l=0, 1, . . . , N/2−1. Similarly, 2:1 downsampling in the vertical direction can also be performed in the DCT domain.

The decimated signal is then obtained by applying the inverse DCT transform of length N/2 to $Y_{k,l}$. There are several special cases that might be usefully applied in this embodiment, although the invention is not limited in scope in this respect. For example, a brickwall filter with coefficients [1 1 1 1 0 0 0 0] in the DCT domain may be implemented that can further simplify the 8-point DCT domain downsampling by two operation. Specifically, the special filter shape avoids folding and addition. Another filer with coefficients [1 1 1 1 0.5 0 0 0] provides a transform function of an antialising filter for the 2:1 operation. Other filters may also be employed, of course.

In order to map such filtered downsampling operation to an AMAAC computation kernel. The element-by-element multiplication operation in DCT domain can be incorporated in the Inverse Quantization block. Specifically, the filter DCT coefficients, $H_{k,l}$, can be combined together with the inverse quantization coefficients. Subsequently, the output of the IQ block is the filtered DCT coefficients, $Y_{k,l}$, of the signal.

FIG. 9 is a block diagram of a reconfigurable downsampling computation engine according to one embodiment of the present invention. As shown in FIG. 9, a plurality of adders and multipliers 910 are configured via switching fabric 905 to operate in either a non-downsampling 920 mode or a downsampling mode 930.

According to one embodiment, to operate in non-downsampling mode 920, adders and multipliers 910 are configured via switching fabric 905 as a plurality of MAAC kernels 405(1)–405(N). To operate in downsampling mode 930, adders and multipliers 910 are configured via switching fabric 905 as a plurality of MAAC kernels 405(1)–405(N) and a plurality of AMAAC kernels 805(1)–805(N).

According to one embodiment, MAAC and AMAAC computational kernels may be combined to generate a reconfigurable computation engine (for example, to compute the IDCT). By allowing this reconfiguration, hardware logic gates can be shared to improve performance without incurring additional cost.

For example, a typical algorithm for computing a 1-D IDCT with 2:1 downsampling is expressed as follows:

$$\begin{bmatrix} x_0 \\ x_1 \\ x_2 \\ x_3 \end{bmatrix} = c(4) * A' \begin{bmatrix} y_0 - y_7 \\ y_2 - y_5 \\ y_1 - y_6 \\ y_3 - y_4 \end{bmatrix} \text{where}$$

$$A = \begin{bmatrix} 1 & 1 & c'(2) & c'(6) \\ 1 & -1 & c'(6) & -c'(2) \\ 1 & -1 & -c'(6) & c'(2) \\ 1 & 1 & -c(2) & -c'(6) \end{bmatrix}$$

Note that for the downsampling operation, compared with a non-downsampling 1-D IDCT, addition is applied to the input data {y0, y1, . . . , y7} first followed by multiplication with the coefficients c'. Since in the first path the input DCT coefficients arrive in a zig-zag order, for a given column the 1-D DCT coefficients arrive serially but interleaved with varying numbers of coefficients in other columns. If the downsampling operation is directly implemented using conventional hardware, there will be a significant number of idle cycles (bubbles) because of the random order of the arriving y coefficients. This may result in pipeline stalls in a conventional hardware architecture.

According to one embodiment, a reconfigurable hardware architecture is realized by performing multiplication operations to the input y terms arriving serially first followed by additions. This ordering may be realized upon examination of the downsampling operation in expanded form as follows:

$$\begin{bmatrix} x_0 \\ x_1 \\ x_2 \\ x_3 \end{bmatrix} =$$

$$c(4) \begin{bmatrix} y_0 - y_7 + y_2 - y_5 + c'(2)*y_1 - c'(2)*y_6 + c'(6)*y_3 - c'6*y_4 \\ y_0 - y_7 - y_2 + y_5 + c'(6)*y_1 - c'(6)*y_6 - c'(2)*y_3 + c'(2)*y_4 \\ y_0 - y_7 - y_2 + y_5 - c'(6)*y_1 + c'(6)*y_6 + c'(2)*y_3 - c'(2)*y_4 \\ y_0 - y_7 + y_2 - y_5 - c'(2)*y_1 + c'(2)*y_6 - c'(6)*y_3 + c'(6)*y_4 \end{bmatrix}$$

In the expanded vector equation above, note that multiplication operations are applied to the input y terms arriving serially first followed by additions. According to one embodiment, in 2:1 downsampling mode, the higher order coefficients (y5, y6 and y7) may be zeroed without causing significant degradation to the output video quality. This is a result of the nature of the energy compaction property of the IDCT.

Zeroing the higher order coefficients, the following expression is obtained:

$$\begin{bmatrix} x_0 \\ x_1 \\ x_2 \\ x_3 \end{bmatrix} = c(4) * A' \begin{bmatrix} y_0 \\ y_2 \\ y_1 \\ y_3 - y_4 \end{bmatrix}$$

By expanding the above matrix equation, the following relationship is obtained:

$x_0 = y_0 + y_2 + c'(2)*y_1 + c'(6)*(y_3 - y_4)$ $x_1 = y_0 - y_2 + c'(6)*y_1 + (-c'(2))*(y_3 - y_4)$ $x_2 = y_0 - y_2 + (-c'(6))*y_1 + c'(2)*(y_3 - y_4)$ $x_0 = y_0 + y_2 + c'(2)*y_1 + c'(6)*(y_3 - y_4)$

Figure 10:
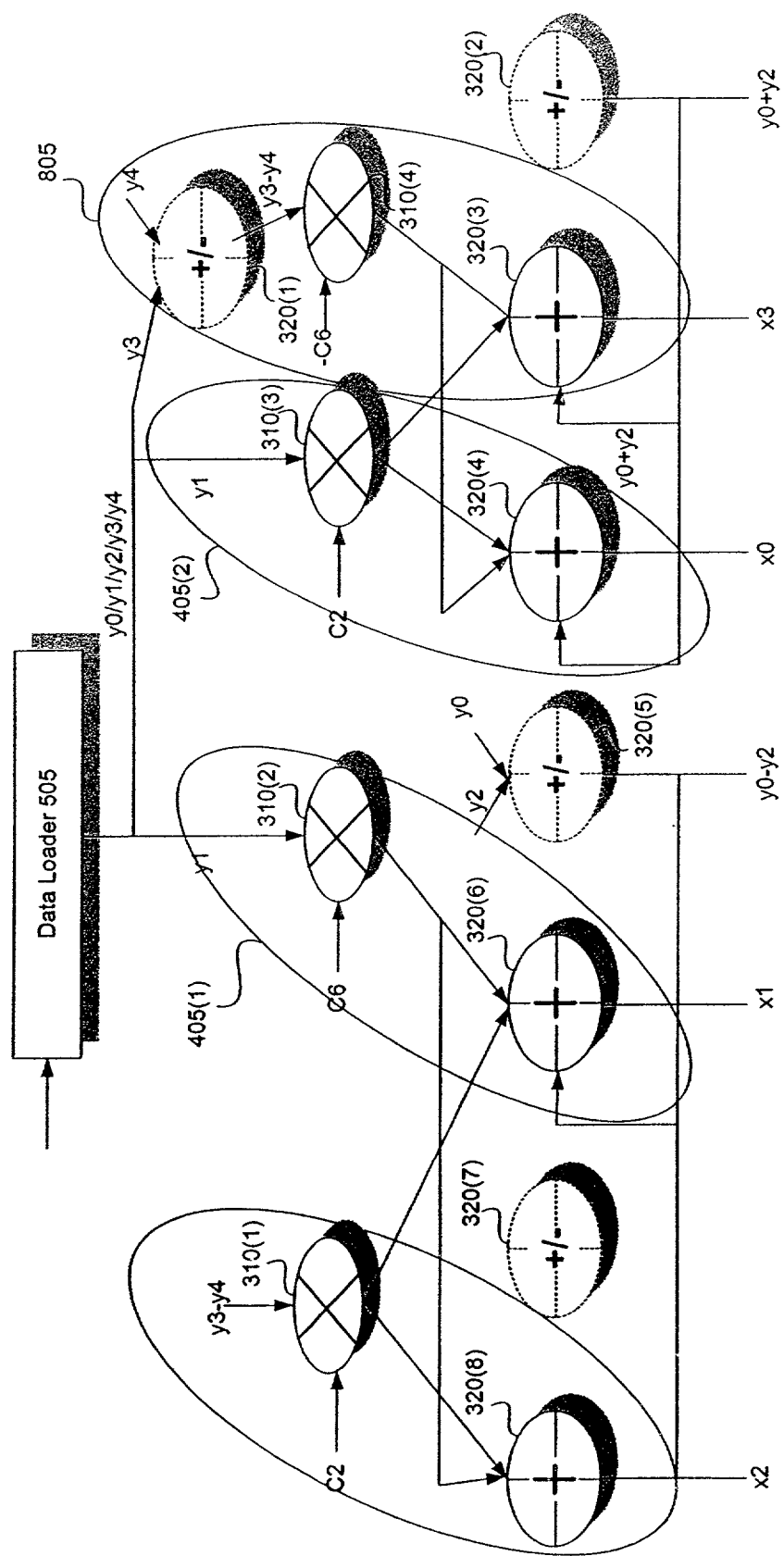
FIG. 10 is a block diagram of a hardware architecture for computing an eight-point IDCT in a 2:1 downsampling mode according to one embodiment of the present invention.

According to one embodiment of the present invention, the above equations are realized according to a hardware embodiment depicted in FIG. 10. Referring to FIG. 10, in the downsampling mode, adders and multipliers are configured as MAAC kernels 405(1) (multiplier 310(2) and 320(6)) and 405(2) (multiplier 310(2) and adder 320(4)) and an AMAAC kernel 805 (adders 320(1), 320(3) and multiplier 310(4)). Comparing the downsampling configuration shown in FIG. 10 with the non-downsampling configuration shown in FIG. 6, note that the four multipliers and eight adders utilized in the non-downsampling mode are also shown in the downsampling mode operation. However, note that four of adders are utilized as shared adders, specifically shared adder 320(5) computing $y_0 - y_2$, shared adder 320(2), computing $y_0 + y_2$ and shared adder 320(1) computing $y_3 - y_4$. Note that adder 320(7) is not utilized in the downsampling configuration.

Figure 11A:
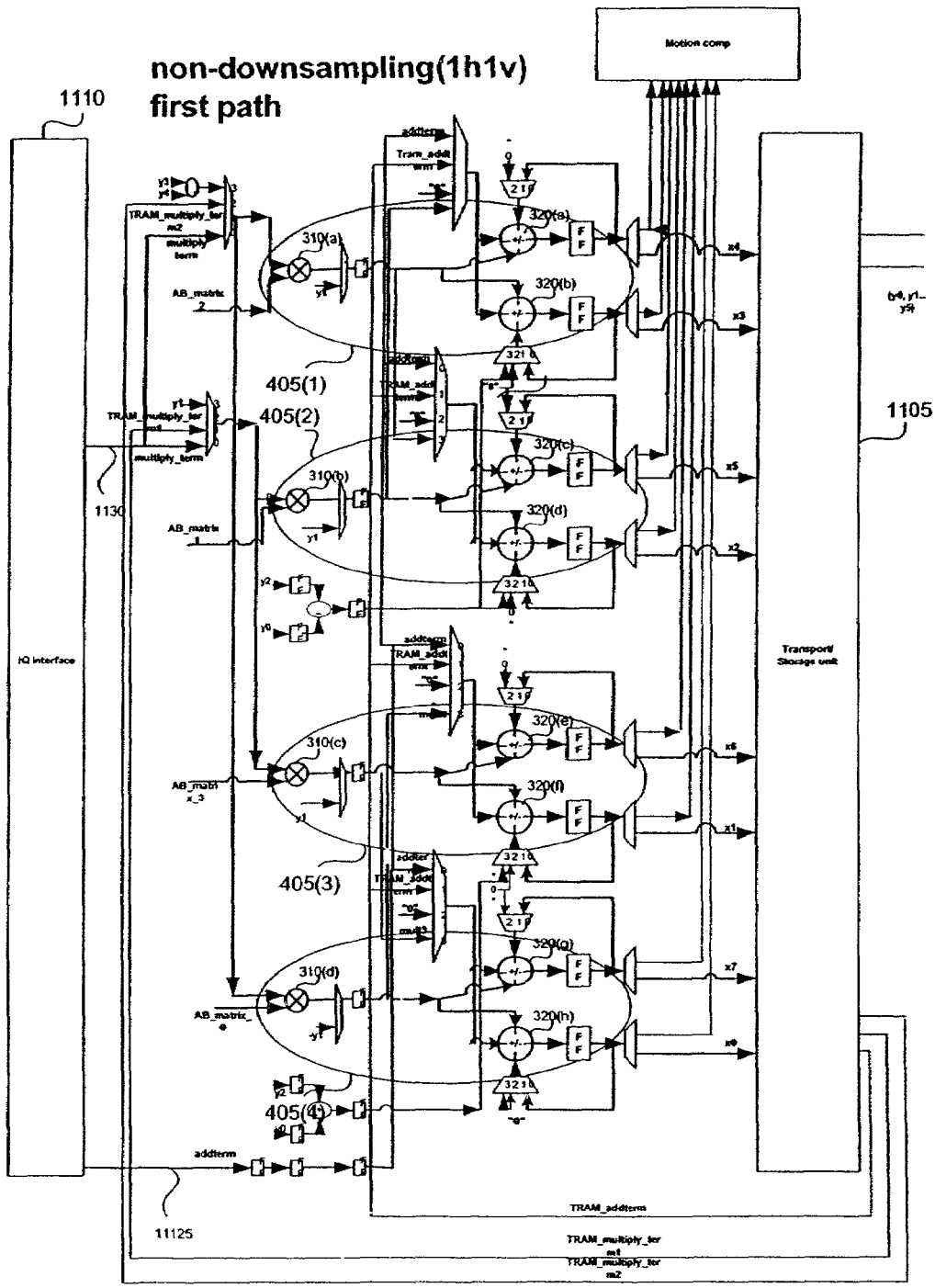
FIG. 11a is a block diagram illustrating a datapath for computing a first path of an eight-point 2-D IDCT in a non-downsampling mode according to one embodiment of the present invention.

FIG. 11a is a block diagram illustrating a datapath for computing a first path of an eight-point 2-D IDCT in a non-downsampling mode (also called the 1h1v mode as the scaling ratios along both horizontal (h) direction and vertical (v) direction are 1:1) according to one embodiment of the present invention. The hardware architecture shown in FIG. 11a improves IDCT computation by simultaneously processing addition and multiply terms.

As derived above, an 8-point IDCT may be expressed as follows:

$$\begin{bmatrix} x_0 \\ x_1 \\ x_2 \\ x_3 \end{bmatrix} = A' \begin{bmatrix} y_0 \\ y_4 \\ y_2 \\ y_6 \end{bmatrix} + B' \begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = A' \begin{bmatrix} y_0 \\ y_4 \\ y_2 \\ y_6 \end{bmatrix} - B' \begin{bmatrix} y_1 \\ y_5 \\ y_3 \\ y_7 \end{bmatrix}$$

$$A' = \begin{bmatrix} 1 & 1 & c'(2) & c'(6) \\ 1 & -1 & c'(6) & -c'(2) \\ 1 & -1 & -c'(6) & c'(2) \\ 1 & 1 & -c'(2) & -c'(6) \end{bmatrix}$$

$$B' = \begin{bmatrix} c'(1) & c'(5) & c'(3) & c'(7) \\ c'(3) & -c'(1) & -c'(7) & -c'(5) \\ c'(5) & c'(7) & -c'(1) & c'(3) \\ c'(7) & c'(3) & -c'(5) & -c'(1) \end{bmatrix}$$

As shown in FIG. 11a, the first path of the 1h1v mode is configured to include four dual MAAC kernels 405(1)–405(4). Note that this configuration corresponds directly to FIG. 6. The four dual MAAC kernels 405(1)–405(4) allow simultaneously processing of addition and multiply terms. According to the above equation, IQ block 130 generates coefficients that must be processed either by performing a multiplication or an addition. The utilization of the MAAC kernels in the datapath shown in FIG. 11a (see FIG. 6) allows simultaneous performance of the multiplication and addition, improving performance.

A portion of the architecture shown in FIG. 11a is responsible for demultiplexing addition and multiply terms received from IQ block 130. In particular, coefficients from IQ block 130 (not shown) are received through IQ interface where they are demultiplexed onto node 1125 (addterm) or node 1130 (multiply$_{13}$term) depending upon whether the coefficient is a multiply or addition term.

Multiply terms are then passed from node 1130 to one of multipliers 310(a)–310(d) via combinational logic. Similarly, addition terms are passed from node 1125 to one of adders 320(a)–320(h). In particular, in the 1h1v first path, y0 and y4 are addition terms while y1, y2, y3, y5, y6 and y7 are multiply terms. Note that these terms may be utilized immediately upon generation from IQ block 130. That is, a bubble is not introduced into the pipeline while waiting for coefficients from IQ block 130.

The intermediate output terms of the first path of the IDCT are stored in transport storage unit 1105 (TRAM) where they await processing by the second path of the IDCT computation.

Figure 11B:
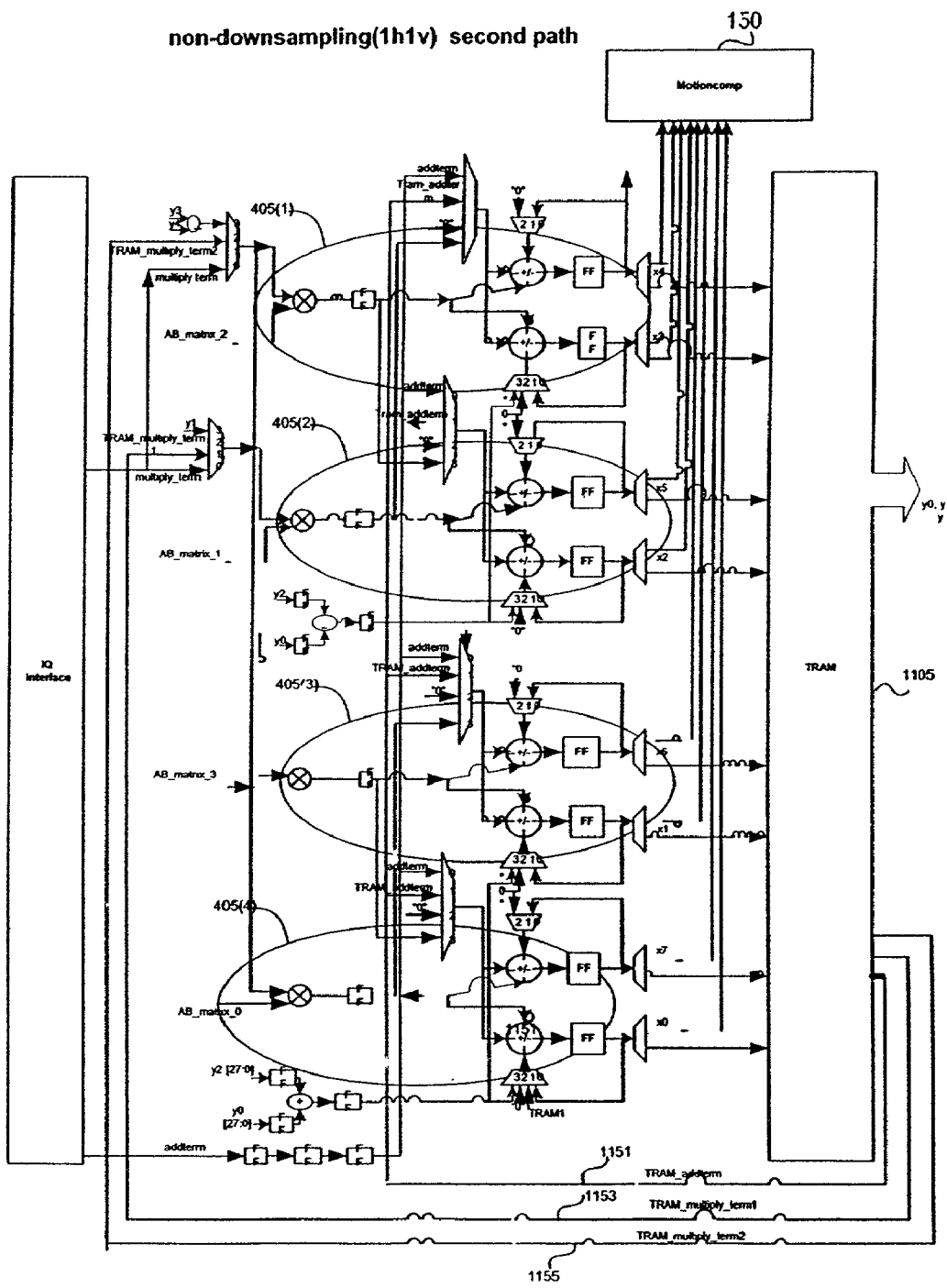
FIG. 11b is a block diagram illustrating a datapath for computing a second path of an eight-point 2-D IDCT in a non-downsampling mode according to one embodiment of the present invention.

FIG. 11b is a block diagram illustrating a datapath for computing a second path of an eight-point 2-D IDCT in a non-downsampling mode according to one embodiment of the present invention. Note that the operative equation for the second path is identical to that presented above for the first path (see FIG. 11a and accompanying text). The configuration for the second 1h1v path corresponds directly to FIG. 6. Thus, similar to the first path four dual MAAC kernels 405(1)–405(4) allow simultaneously processing of addition and multiply terms. According to the above equation, IQ block 130 generates coefficients that must be processed either by performing a multiplication or an addition. The utilization of the MAAC kernels in the datapath shown in FIG. 11b (see FIG. 6) allows simultaneous performance of the multiplication and addition, improving performance.

With respect to the data flow, the only difference is that y terms in the equation are originated from TRAM 1105 and the calculated x terms are output to motion compensation block 150. Note that upon completion of the 1h1v 2nd path, 3 right shifts are performed due to the initial factoring of ½*C(4) in the first and second paths. Thus, at the end three right shifts ½*c(4)*½*c(4)=½*½*½ are required in order to obtain the final correct 2-D IDCT results.

Figure 12A:
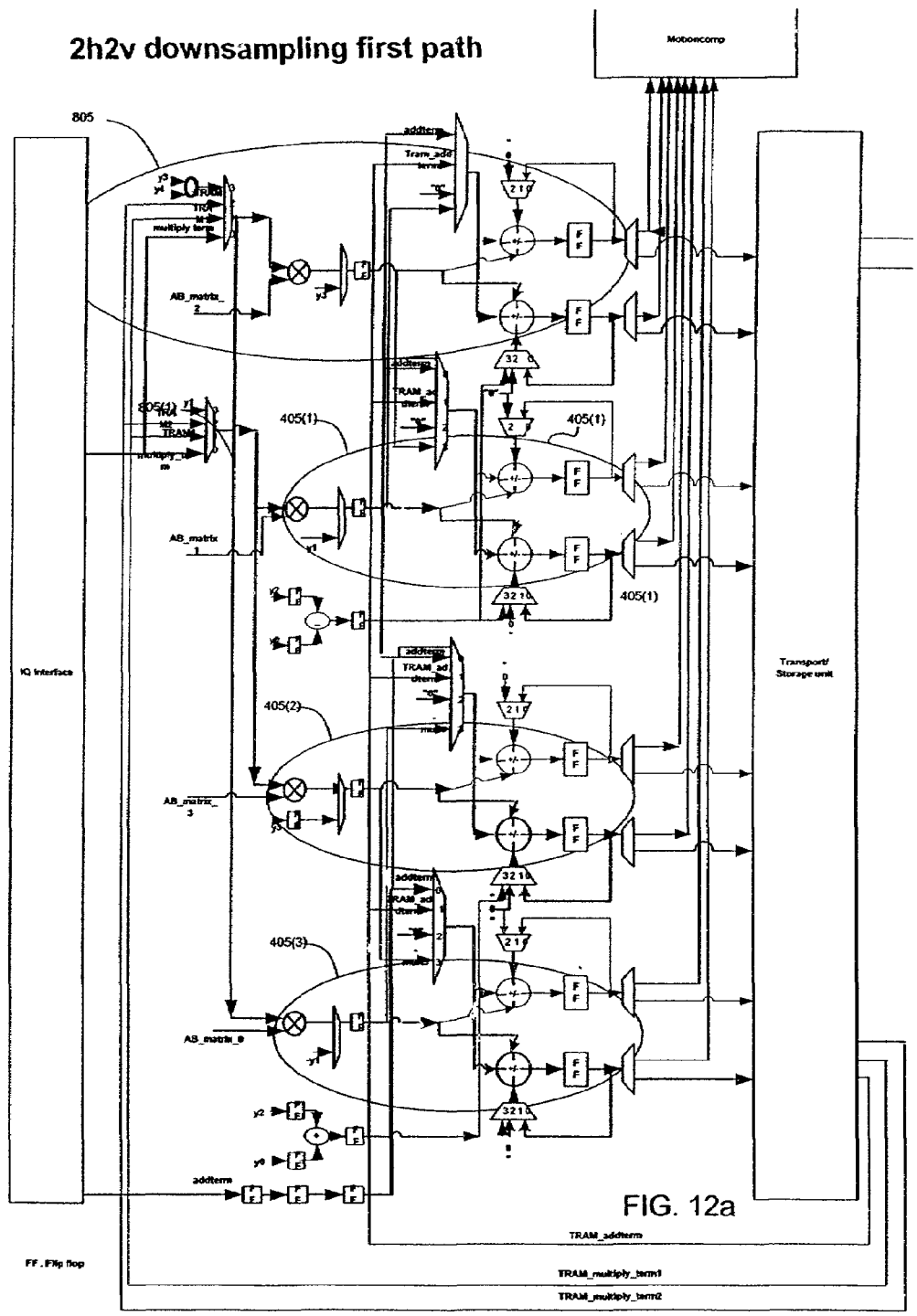
FIG. 12a is a block diagram illustrating a datapath for computing a first path of an eight-point to four-point 2-D IDCT in a downsampling mode according to one embodiment of the present invention.

FIG. 12a is a block diagram illustrating a datapath for computing a first path of an eight-point to four-point 2-D IDCT in a downsampling mode (also called the 2h2v mode as the scaling ratios along both horizontal (h) direction and vertical (v) direction are 2:1) according to one embodiment of the present invention. Recall, as derived above, computation of a 2-1 downsampled eight-point IDCT may be expressed as follows:

$$\begin{bmatrix} x_0 \\ x_1 \\ x_2 \\ x_3 \end{bmatrix} =$$

$$\begin{bmatrix} y0 - y7 + y2 - y5 + c'(2)*y1 - c'(2)*y6 + c'(6)*y3 - c'(6)*y4 \\ y0 - y7 - y2 + y5 + c'(6)*y1 - c'(6)*y6 - c'(2)*y3 + c'(2)*y4 \\ y0 - y7 - y2 + y5 - c'(6)*y1 + c'(6)*y6 + c'(2)*y3 - c'(2)*y4 \\ y0 - y7 + y2 - y5 - c'(2)*y1 + c'(2)*y6 - c'(6)*y3 + c'(6)*y4 \end{bmatrix}$$

As shown in FIG. 12a, the first path of the 2h2v mode is configured to include MAAC kernels 405(1)–405(4). Note that this configuration corresponds directly to FIG. 6. The use of four MAAC kernels 405(1)–405(4) allows simultaneously processing of addition and multiply terms. According to the above equation, IQ block 130 generates coefficients that must be processed either by performing a multiplication or an addition. The utilization of the MAAC kernels 405(1)–405(4) in the datapath shown in FIG. 12a (see FIG. 6) allows simultaneous performance of the multiplication and addition, improving performance.

In particular, in the 2h2v first path, y0, y7, y2 and y5 are involved in an addition operation and y1, y3, y4, y6 are involved in a multiply operation. Using the above architecture, it will take 4 clocks for 1-column coefficients to finish the first path of a 2-D 2h2v IDCT. For an 8×8 block with all non-zero coefficients, it will take 4×8=32 clocks to finish 1-D IDCT. Because it is 2h2v mode, and 2:1 downsampling is performed in a vertical direction, every time, only four terms are output per operation. Thus, although the architecture includes 4 multipliers and 8 adders in the block diagram of FIG. 12a, only 4 multipliers and 4 adders are actually involved in the computation in the first path.

Figure 12B:
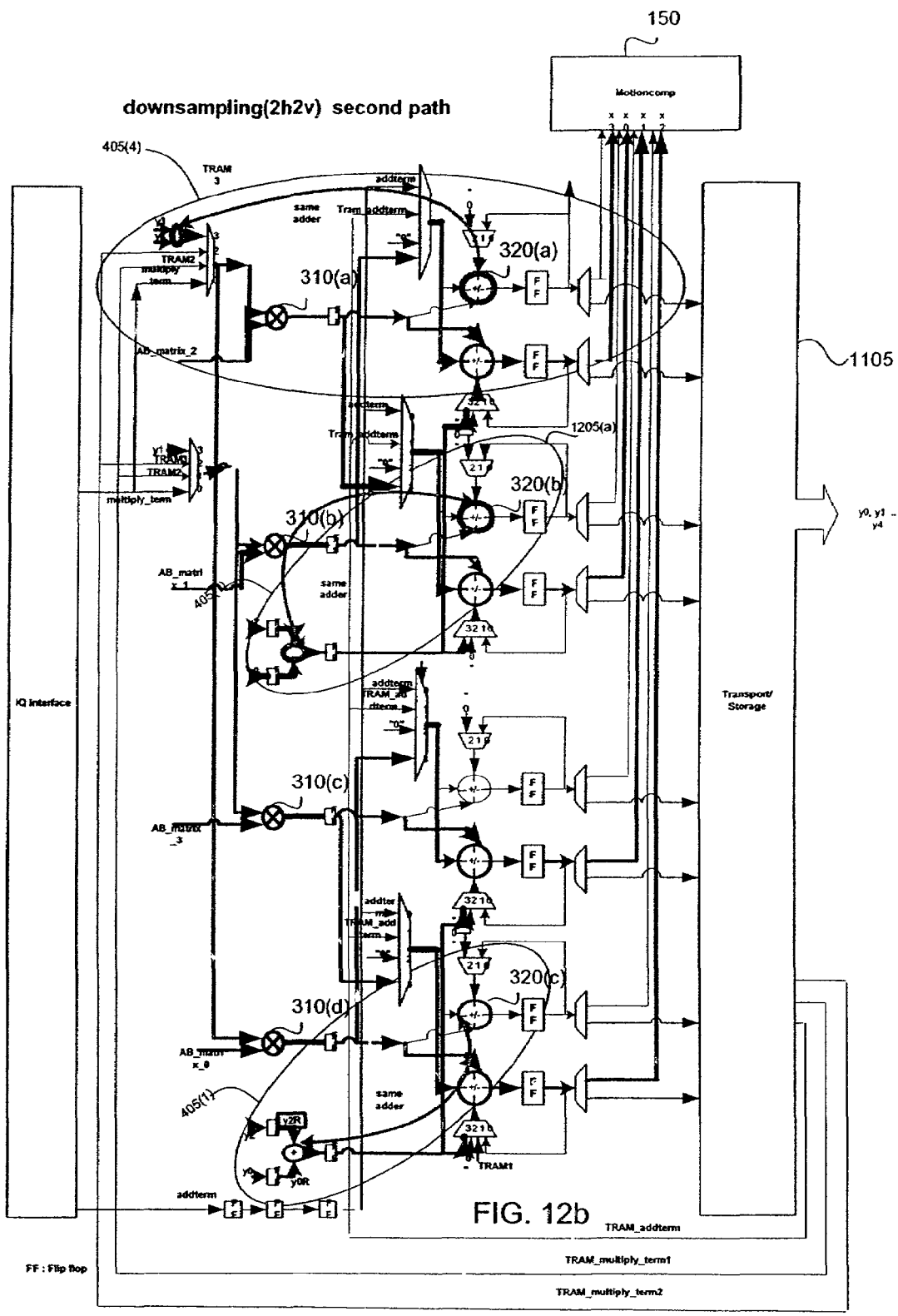
FIG. 12b is a block diagram illustrating a datapath for computing a second path of an eight-point to four-point 2-D IDCT in a downsampling mode according to one embodiment of the present invention.

FIG. 12b is a block diagram illustrating a datapath for computing a second path of an eight-point to four-point 2-D IDCT in a downsampling mode according to one embodiment of the present invention. In this path one AMAAC kernel 805 is utilized along with three additional addition computations. Note that the AMAAC kernel 805 utilizes adder 320(a) in a shared configuration. In the 2h2v 2nd path, 7 adders and 4 multipliers are utilized.

Also note that in the 2nd path of 2h2v, all the y inputs (y0, y1 . . . , y4) originate from TRAM 1105, and thus all terms are available simultaneously. Further, note that the equation cited above for the first path 2h2v is also operative for the second path. By rewriting the above matrix equation as
x0=y0+y2+c'(2)*y1+c'(6)*(y3−y4)
x1=y0−y2+c'(6)*y1+(−c'(2))*(y3−y4)
x2=y0−y2+(−c'(6))*y1+(c'(2)*(y3−y4)
x3=y0+y2+(−c'(2))*y1+(−c'(6))*(y3−y4)

it can be seen that the other adders 320(*a*)–320(*c*) may be used to calculate:
add1=y3−y4
add2=y0−y2
add3=y0+y2 and 4 multipliers 310(*a*)–320(*d*) can be used to calculate:
mult1=c'(2)*(y3−y4)=c'(2)* add1
mult2=c'(6)*y1=c'(6)*y1
mult3=c'(2)*y1=c'(6)*y1
mult4=(−c'(6))*(y3−y4)=(−c'(6))*add1

In the final stage, the following state is obtained:
x0=add3+mult3+(−mult4)
x1=add2+mult2+(−mult1)
x2=add2+(−mult2)+(mult1)
x3=add3+(−mult3)+(mult4)

Thus, for the second path in 2h2v mode, all 1-D row IDCT can be completed in just one cycle. This improved throughput in IDCT stage matches very well with the improved throughput in motion compensation unit 150 that follows.

At the completion of the 2h2v 2nd path a right shift is necessary because in the first path and second path c(4) was factored out, and therefore the calculation c(4)* C(4)=½ must be performed at the end.

According to one embodiment the MAAC and AMAAC operations may be incorporated into the instruction set of a CPU or DSP processor that incorporates one MAAC and/or AMAAC kernels. This would allow compilation of a source program to directly take advantage of these hardware structures for signal processing operations.

What is claimed is:

1. A reconfigurable hardware apparatus to perform computational operations in one of a downsampling mode and a non-downsampling mode, comprising:
   a plurality of adders, each of the plurality of adders including at least two inputs and one output;
   a plurality of multipliers, each of the plurality of multipliers including at least two inputs and one output;
   a switching fabric to switch between a downsampling mode of operation and a non-downsampling mode of operation, wherein the switching fabric is to provide for a configuration of the inputs and outputs of the adders with respect to the inputs and outputs of the multipliers; and,
   a control logic block to control the switching fabric wherein in the non-downsampling mode, the switching fabric is to configure the multipliers and adders into a configuration that includes a plurality of MAAC kernels.

2. The hardware apparatus according to claim 1, wherein in the downsanipling mode, the switching apparatus is to configure the multipliers and adders into a configuration that includes the plurality of MAAC kernels and at least one AMAAC kernel.

3. The hardware apparatus according to claim 2, wherein the AMAAC kernel includes a multiplier block, a first adder block, a second adder block and a register block, wherein the first adder block is to receive two inputs (e(i) and a(i)) and an output of the first adder block is coupled to a first input of the multiplier block, the multiplier block is to receive a second input (b(i)) and an output of the multiplier block coupled to a first input of the second adder block, the second adder block is to receive a second input (c(i)) and an output of the second adder block is coupled to an input of the register block, an output of the register block coupled to a third input of the second adder block.

4. The hardware apparatus according to claim 1, wherein the MAAC kernel includes a multiplier block, an adder block and a register block, wherein an output of the multiplier block is coupled to an input of the adder block, an output of the adder block is coupled to an input of the register block and an output of the register block is coupled to a second input of the adder block and the adder block is to receive at its second input an additional addend.

5. The hardware apparatus according to claim 1, wherein the computational operations include transformations.

6. The hardware apparatus according to claim 5, wherein the transformations include an inverse Discrete Cosine Transform (IDCT).

7. The hardware apparatus according to claim 6, wherein in the non-downsampling mode, an eight-point IDCT is to be computed utilizing the following expression:

$$\begin{bmatrix} x_0 \\ x_1 \\ x_2 \\ x_3 \end{bmatrix} = \frac{1}{2}A'\begin{bmatrix} y_0 \\ y_4 \\ y_2 \\ y_6 \end{bmatrix} + \frac{1}{2}B'\begin{bmatrix} y_1 \\ y_5 \\ y_3 \\ y_7 \end{bmatrix} \quad \begin{bmatrix} x_7 \\ x_6 \\ x_5 \\ x_4 \end{bmatrix} = \frac{1}{2}A'\begin{bmatrix} y_0 \\ y_4 \\ y_2 \\ y_6 \end{bmatrix} - \frac{1}{2}B'\begin{bmatrix} y_1 \\ y_5 \\ y_3 \\ y_7 \end{bmatrix}$$

where:

$$A' = \begin{bmatrix} 1 & 1 & c'(2) & c'(6) \\ 1 & -1 & c'(6) & -c'(2) \\ 1 & -1 & -c'(6) & c'(2) \\ 1 & 1 & -c'(2) & -c'(6) \end{bmatrix}$$

$$B = \begin{bmatrix} c'(1) & c'(5) & c'(3) & c'(7) \\ c'(3) & -c'(1) & -c'(7) & -c'(5) \\ c'(5) & c'(7) & -c'(1) & c'(3) \\ c'(7) & c'(3) & -c'(5) & -c'(1) \end{bmatrix}.$$

8. The hardware apparatus according to claim 6, wherein in the downsampling mode, a 2:1 downsampling of an eight-point IDCT is to be computed utilizing the following expression:

$$\begin{bmatrix} x_0 \\ x_1 \\ x_2 \\ x_3 \end{bmatrix} = c(4) \begin{bmatrix} y_0 - y_7 + y_2 - y_5 + c'(2)*y_1 - c'(2)*y_6 + c'(6)*y_3 - c'6*y_4 \\ y_0 - y_7 - y_2 + y_5 + c'(6)*y_1 - c'(6)*y_6 - c'(2)*y_3 + c'(2)*y_4 \\ y_0 - y_7 - y_2 + y_5 - c'(6)*y_1 + c'(6)*y_6 + c'(2)*y_3 - c'(2)*y_4 \\ y_0 - y_7 + y_2 - y_5 - c'(2)*y_1 + c'(2)*y_6 - c'(6)*y_3 + c'(6)*y_4 \end{bmatrix}.$$

9. A method of performing computational operations, comprising:

provyding a plurality of adders, each of the plurality of adders including at least two inputs and one output;

providing a plurality of multipliers, each of the plurality of multipliers including at least two inputs and one output;

controlling a switching fabric that provides for a configuration of the inputs and outputs of the adders with respect to the inputs and outputs of the multipliers so as to create a configuration that includes a plurality of MAAC kernals and switch between a downsampling mode of operation and a non-downsampling mode of operation.

10. The method of claim 9, wherein in said controlling operation, the switching fabric configures the multipliers and adders into a configuration that includes at least one AMAAC kernel.

* * * * *